US009937615B1

(12) United States Patent
Winnard

(10) Patent No.: US 9,937,615 B1
(45) Date of Patent: Apr. 10, 2018

(54) ADJUSTABLE TOOL HOLDER

(71) Applicant: Stanley D. Winnard, Dallas, TX (US)

(72) Inventor: Stanley D. Winnard, Dallas, TX (US)

( * ) Notice: Subject to any disclaimer, the term of this patent is extended or adjusted under 35 U.S.C. 154(b) by 0 days.

(21) Appl. No.: 14/983,730

(22) Filed: Dec. 30, 2015

(51) Int. Cl.
*B25H 3/04* (2006.01)
*A47J 47/16* (2006.01)
*A47B 45/00* (2006.01)

(52) U.S. Cl.
CPC .............. *B25H 3/04* (2013.01); *A47B 45/00* (2013.01); *A47J 47/16* (2013.01)

(58) Field of Classification Search
CPC ............. B25H 3/04; A47B 45/00; A47J 47/16
USPC ........................................................ 211/70.6
See application file for complete search history.

(56) References Cited

U.S. PATENT DOCUMENTS

| 58,363 | A | * | 10/1866 | Adair | B43K 23/001 |
| | | | | | 211/120 |
| 340,322 | A | * | 4/1886 | Keep | B43K 23/001 |
| | | | | | 131/257 |
| 627,622 | A | * | 6/1899 | Meyer | A47L 21/00 |
| | | | | | 15/104.001 |
| 642,277 | A | * | 1/1900 | Adair | B43K 23/001 |
| | | | | | 211/120 |
| 1,240,706 | A | * | 9/1917 | Gropengieser | B43K 23/001 |
| | | | | | 211/120 |
| D52,295 | S | * | 8/1918 | Weeks | 211/69.8 |
| 2,279,643 | A | * | 4/1942 | Silver | B07C 7/02 |
| | | | | | 211/11 |
| 4,884,701 | A | * | 12/1989 | Nymark | B43M 99/008 |
| | | | | | 211/69.8 |
| 5,421,466 | A | * | 6/1995 | Hsu | A47B 63/00 |
| | | | | | 211/120 |
| 2015/0336262 | A1 | * | 11/2015 | Kao | B25H 3/06 |
| | | | | | 206/378 |

* cited by examiner

*Primary Examiner* — Korie H Chan
(74) *Attorney, Agent, or Firm* — Peter V. Schroeder; Booth Albanesi Schroeder PLLC

(57) ABSTRACT

Disclosed is an adjustable tool holder for holding workshop tools and the like. The tool holder comprises an elongate, rectangular base member comprising a longitudinal central groove, the base member extending between proximal and distal extremities, an elongate, central bar disposed within the groove centrally, the central bar laterally divided into toothed and plain portions terminating at the proximal and distal portions respectively, a longitudinal edge of the toothed portion comprising teeth, a slider adapted to slide along the length of the toothed portion, and a compression spring, one end of which secured to the slider while the other end secured to a distal extremity, the spring wound around the central bar. Sliding the slider to any point on the toothed portion causes length of the spring to be automatically altered accordingly, while the teeth prevent the slider from freely sliding towards the proximal end. A tool is adapted to be held between two consecutive loops of the spring.

7 Claims, 10 Drawing Sheets

ADJUSTABLE TOOL HOLDER

BACKGROUND

Field of the Invention

The present invention relates to tool holders and more particularly to a tool holder that is configured to manually adjustable to suit the dimensions of the tools.

Handheld tools such as kitchen tools and workshop tools, when not in use, are generally hung upon hooks, which, in most cases are coupled to a pegboard. Securing hooks to a pegboard or, in other words, setting up a pegboard is a time-consuming process as, most of the times, the hooks are required to be secured with fasteners, such as, screws, or the like, so that, the hooks they do not come off of it. This—the coming off of the hooks—is caused by the hooks getting stuck with the tools whereby, as the tools are disengaged from the pegboard, the hooks come off with them. Even if the inconvenience of the securing pegs and hooks is ignored for a moment, one needs to pay careful attention while placing especially certain elongate tools to the pegboard as these tools require to be supported by not one, but two or more hooks. Therefore, in a nutshell, placing as well as removing tools from a conventional pegboard or hook systems requires a mental effort on part of the user.

Alternatively, placing the tools on a flat surface, such as, on a table top, etc., is not an ideal solution either. This is because firstly, storage on a horizontal surface expends large space and secondly, placing the tools on a flat surface may lead to a pile up, which may result in the tools falling off ultimately leading to their breakage, etc.

Therefore, in the light of what is discussed and while doing entirely away with the idea of storage on horizontal spaces, there is a need in the art for a solution in the form of a tool holder, which makes it relatively convenient for a tool to be secured thereto. Better yet is such a tool holder that is easily adjustable to accommodate tool of various dimensions.

SUMMARY

The present invention comprises an adjustable tool holder for holding a plurality of elongate hand tools. The tool holder comprises an elongate rectangular base member with an elongate, rectangular, longitudinal grove centrally disposed thereon. An elongate, rectangular, planar central bar is located within the groove such that, the central bar aerially suspended within the groove as the extremities of the central bar is attached to the extremities of the base member. The central bar is laterally divided into a toothed portion and a plain portion wherein, one of the longitudinal edges of the toothed portion comprises friction teeth.

The tool holder further comprises a slider, which is configured to be snugly and slidably received within the groove. The slider comprises a thorough slit for snugly receiving the central bar therethrough. On account of the relationship between the slit and the toothed portion, the slider is configured to slide only along the length of the toothed portion. More particularly, the slider, on account of being frictionally constrained, is configured to non-freely slide along the length of the toothed portion, meaning, the slider, unless manually actuated, cannot slide along the length of the toothed portion.

The tool holder further comprises a D-shaped compression spring, which, while wound around the central bar, extends between the slider and an extremity of the base member to which, the plain portion is connected. A tool is secured to the tool holder as the tool is received between two consecutive loops of the spring. As force of the spring exerted on the slider is not enough to overcome the frictional lock between the slit and the teeth, the distance between the loops is adjustable through the actuation of the slider so as to achieve a tighter fit between the loops and the tool.

Other objects and advantages of the embodiments herein will become readily apparent from the following detailed description taken in conjunction with the accompanying drawings.

FIGURES—REFERENCE NUMERALS

10—Adjustable Tool Holder
12—Base Member
14—Central Bar
16—Slider
18—D-shaped Compression Spring
20—Groove
22—Ridge
24—End Cap
26—Toothed Portion
28—Plain Portion
30—Friction Tooth
32—Slider Base
34—Ridge Track
36—Slit
38—Actuator Surface 40—Spring Hole
42—Loop
44—Elongate Section of the Loop
46—Tool

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
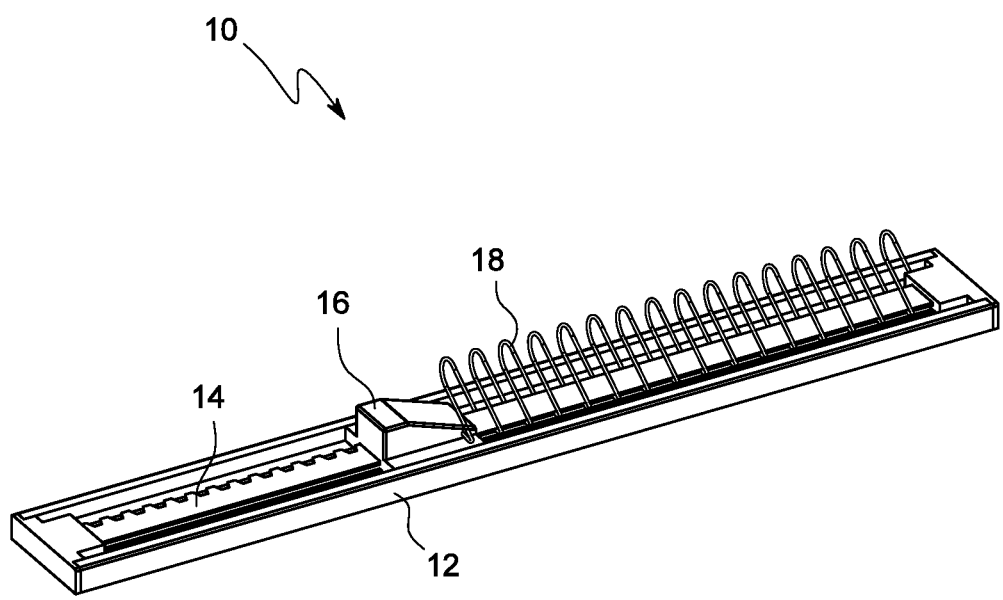
FIG. 1, according to an embodiment of the present invention, is an illustration of a perspective view of the tool holder.
Figure 2:
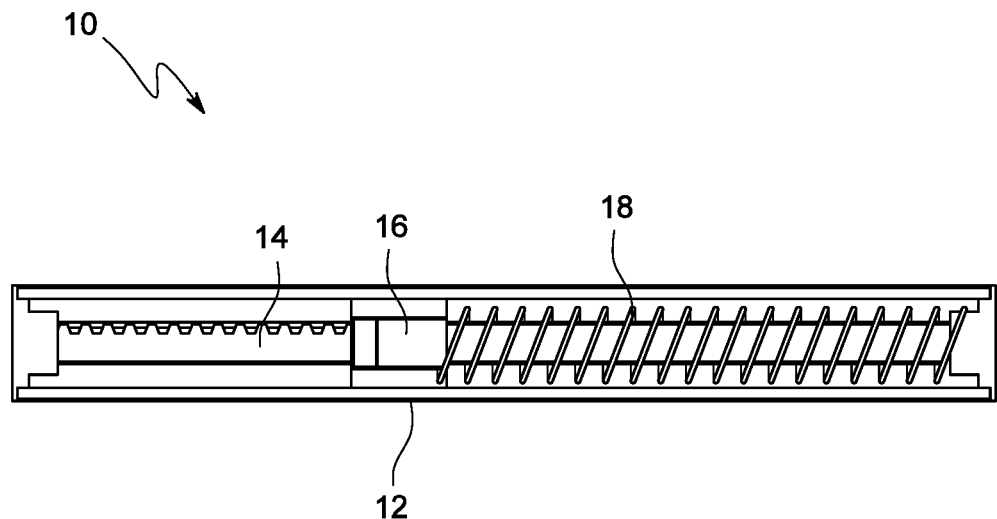
FIG. 2, according to an embodiment of the present invention, is an illustration of the top view of the tool holder.
Figure 3:
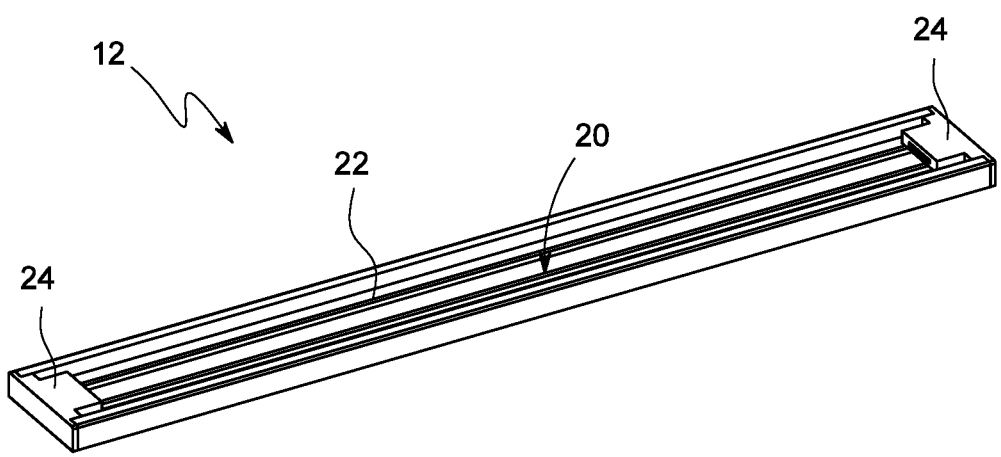
FIG. 3, according to an embodiment of the present invention, is an illustration of a perspective view of the base member.
Figure 4:
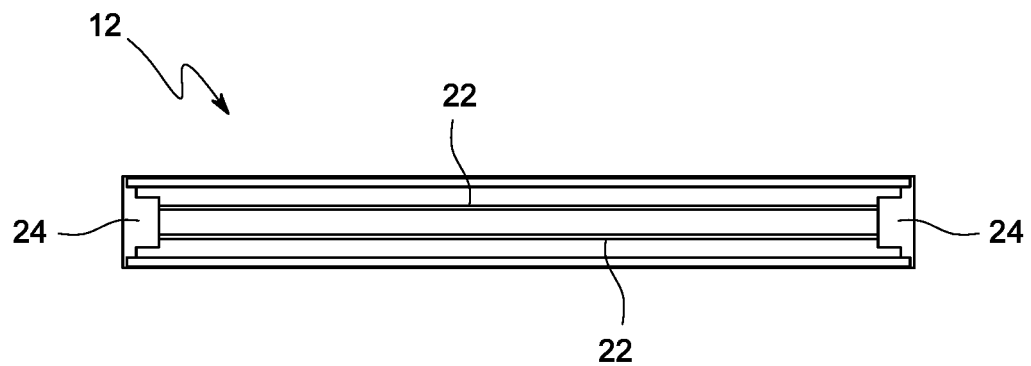
FIG. 4, according to an embodiment of the present invention, is an illustration of the top view of the base member.
Figure 5:
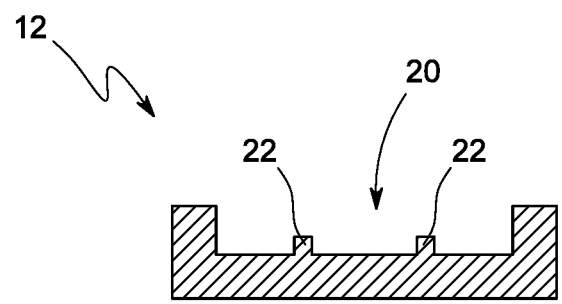
FIG. 5, according to an embodiment of the present invention, is an illustration of a cross-sectional view of the base member.
Figure 6:
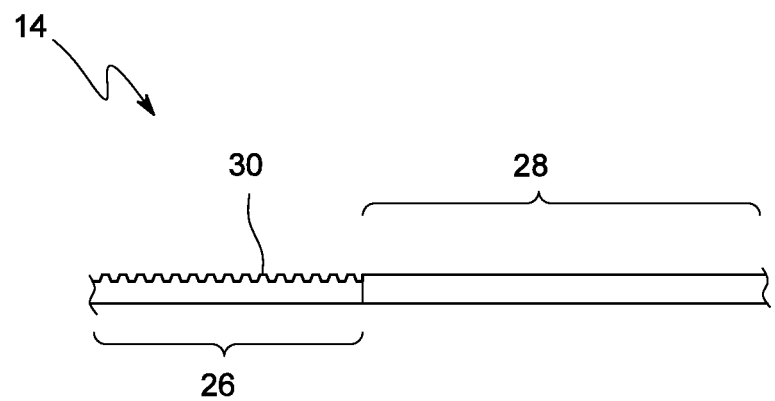
FIG. 6, according to an embodiment of the present invention, is an illustration of a plan view of the central bar.
Figure 7:
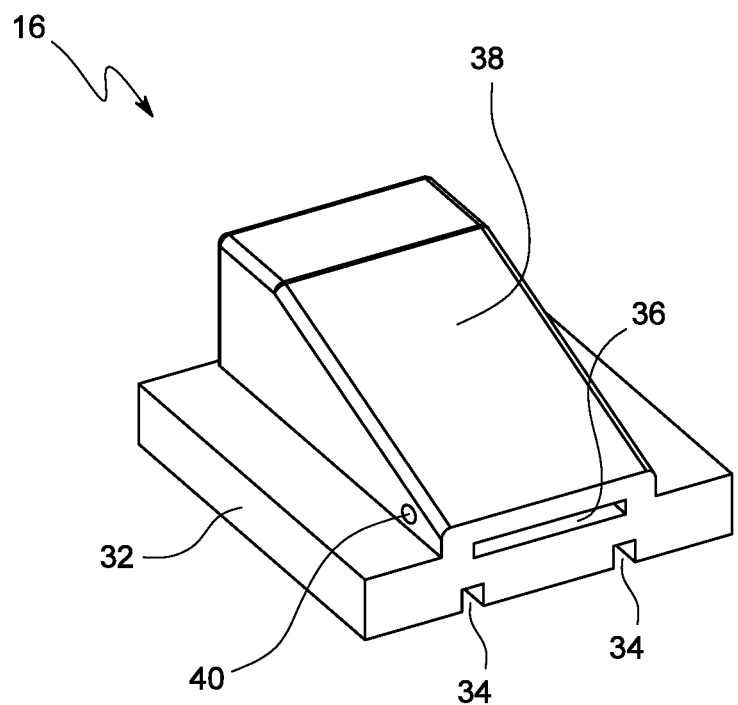
FIG. 7, according to an embodiment of the present invention, is an illustration of a perspective view of the slider.
Figure 8:
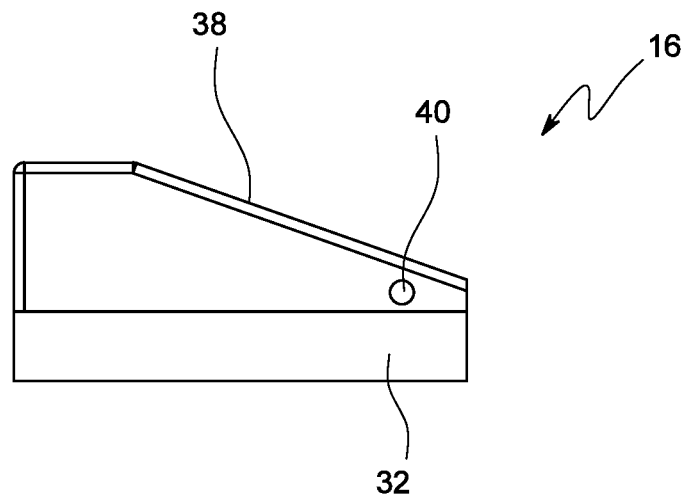
FIG. 8, according to an embodiment of the present invention, is an illustration of a side view of the slider.
Figure 9:
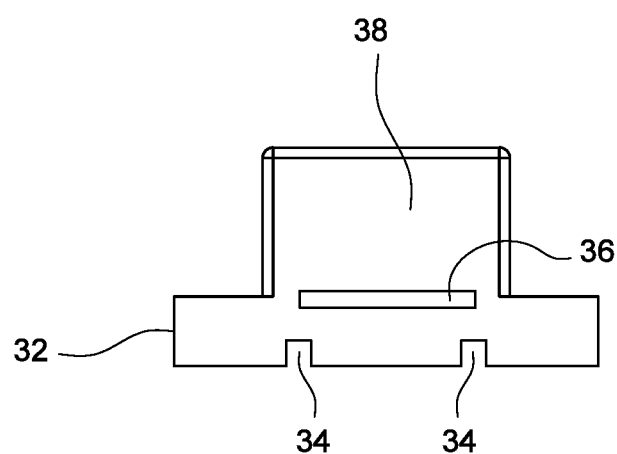
FIG. 9, according to an embodiment of the present invention, is an illustration of a front view of the slider.
Figure 10:
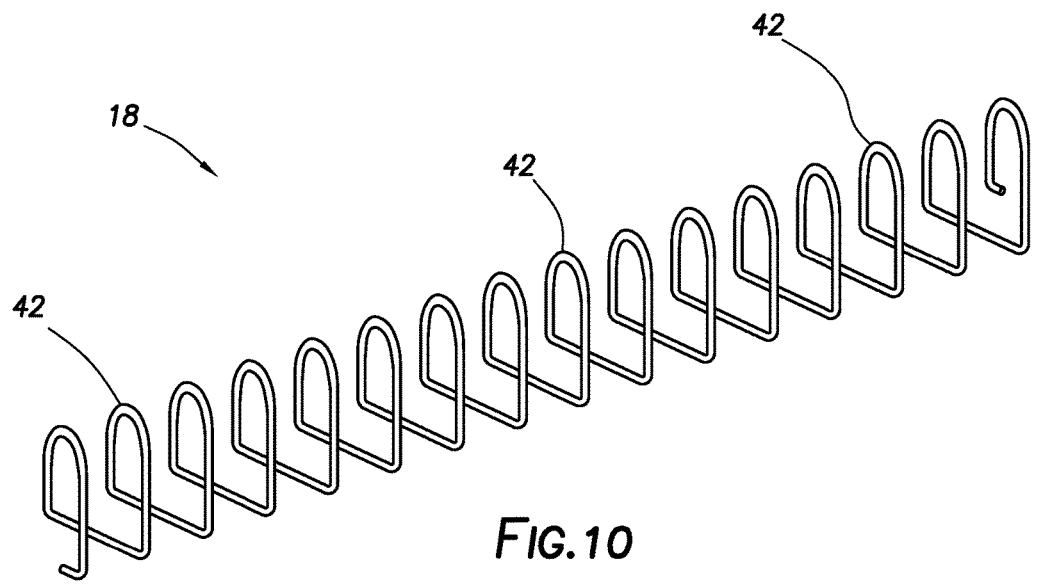
FIG. 10, according to an embodiment of the present invention, is an illustration of a perspective view of the D-shaped compression spring.
Figure 11:
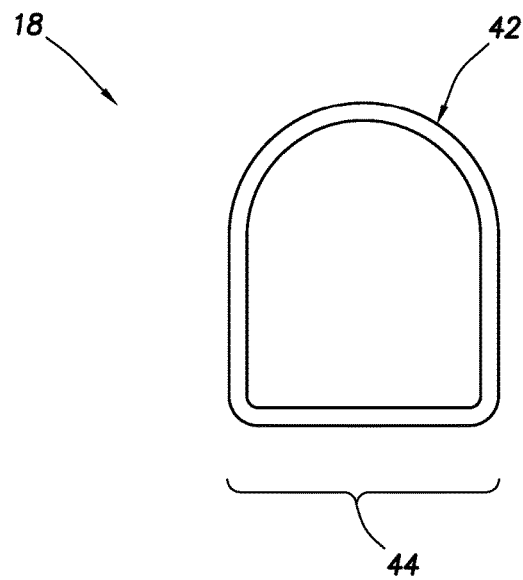
FIG. 11, according to an embodiment of the present invention, is an illustration of a front view of the D-shaped compression spring.

Referring to FIGS. 1 and 2, the present invention comprises an adjustable tool holder 10 for holding a plurality of elongate hand tools. The tool holder 10, which is simple in construction, comprises a base member 12, a central bar 14, a slider 16, and a compression spring 18 wherein, each of the components and the mutual relationship thereof will become apparent from the following body of text.

Referring to FIGS. 1 through 5, the base member 12 comprises an elongate, rectangular structure of uniform substantially U-shaped cross-section defined between a proximal and a distal extremity. More particularly, the base member 12 comprises a central longitudinal groove 20 of uniform, substantially rectangular cross-section. A pair of parallel ridges 22 extends along the length of the groove 20 wherein, the utility of the ridges 22 will become apparent from the following body of text. As can be appreciated from FIGS. 3 and 4, the base member 12 further comprises a pair of end caps 24, viz., a proximal and a distal end cap, fitted to the proximal and distal ends thereof. The distal cap 24 comprises a spring hole (not shown) disposed on a side thereof wherein, the utility of the spring hole will become apparent from the following body of text.

Referring to FIGS. 1, 2, 3 and 6, the central bar 14 comprises an elongate, rectangular planar structure laterally divided into a toothed portion 26 and a plain portion 28. As can be appreciated from FIG. 6, one of the longitudinal edges of the toothed portion 26 comprises friction teeth 30, the utility of which will become apparent from the following body of text. The central bar 14, while extending between the end caps 24, is also central aligned with respect to the pair of ridges 22. Barring the extremities of the central bar 14, the rest thereof is aerially suspended such that, the central bar 14 is parallel to the upper surface of the groove 20. Notably, the proximal end cap 24 receives the toothed portion 26, while the distal end cap 24 receives the plain portion 28.

Referring to FIGS. 1, 2 and 7 through 9, the slider 16 comprises a rectangular slider base 32 that is dimensionally configured to be snugly and slidably received within the groove 20. More particularly, the slider base 32 comprises a pair of parallel ridge tracks 34 within which, the ridges 22 are snugly received as the slider base 32 sits within the groove 20. The slider 16 comprises a thorough slit 36 for snugly receiving the central bar 14 therethrough. On account of the relationship between the slit 36 and the toothed portion 26, the slider 16 is configured to slide only along the length of the toothed portion 26. More particularly, the slider 16, on account of being frictionally constrained, is configured to non-freely slide along the length of the toothed portion 26, meaning, the slider 16, unless manually actuated, cannot slide along the length of the toothed portion 26. The slider 16 further comprises an oblique top surface 38 for ergonomic reasons. A spring hole 40 is disposed on a side of the slider 16 wherein, the utility of the spring hole 40 will become apparent from the following body of text.

Figure 12:
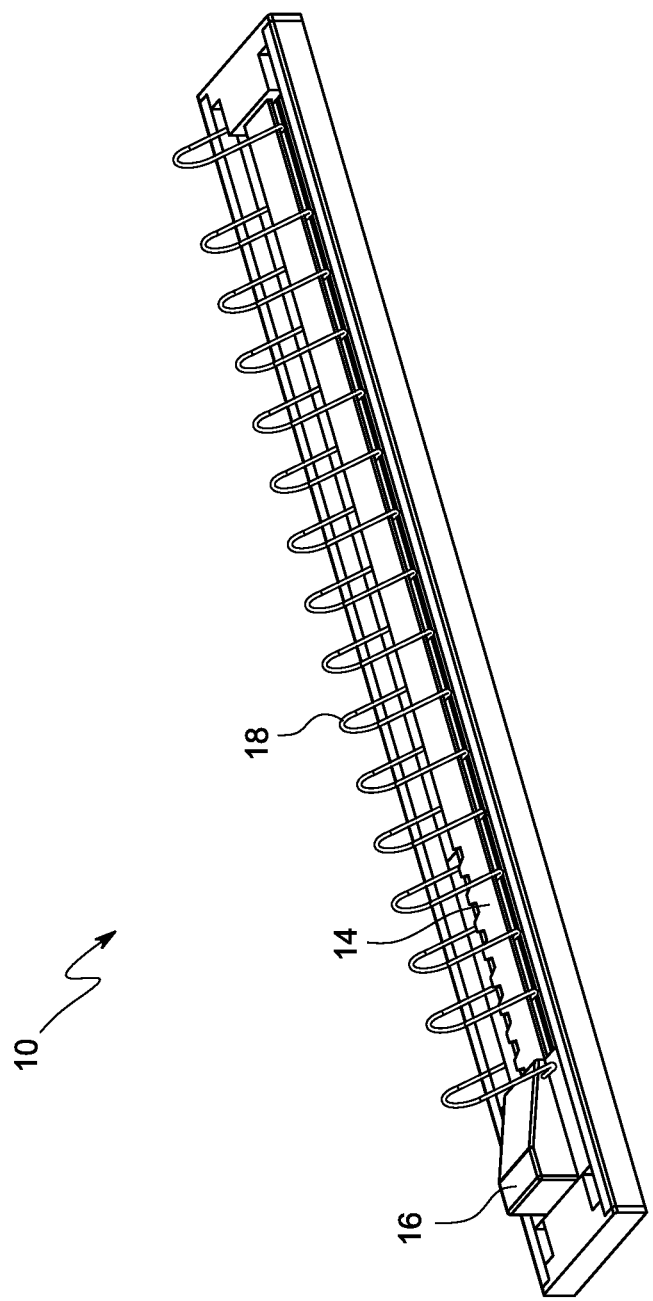
FIGS. 12 through 14, according to an embodiment of the present invention, are illustrations of various sequential positions of the slider.
Figure 13:
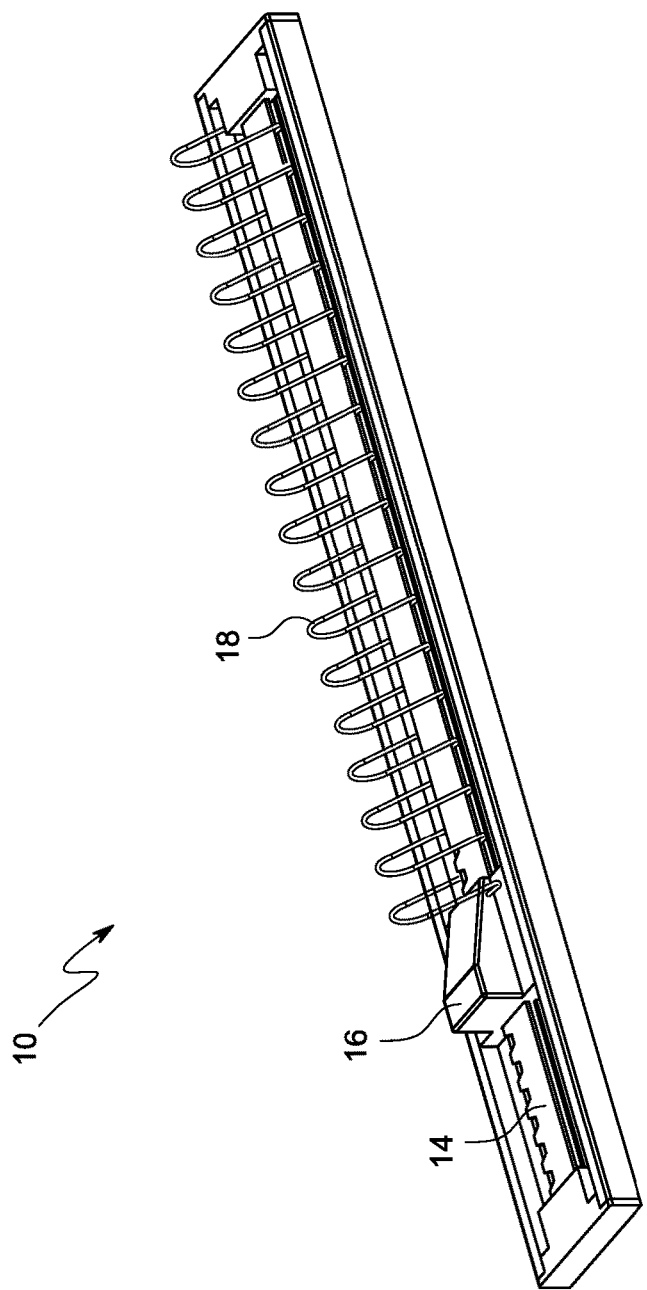
Figure 14:
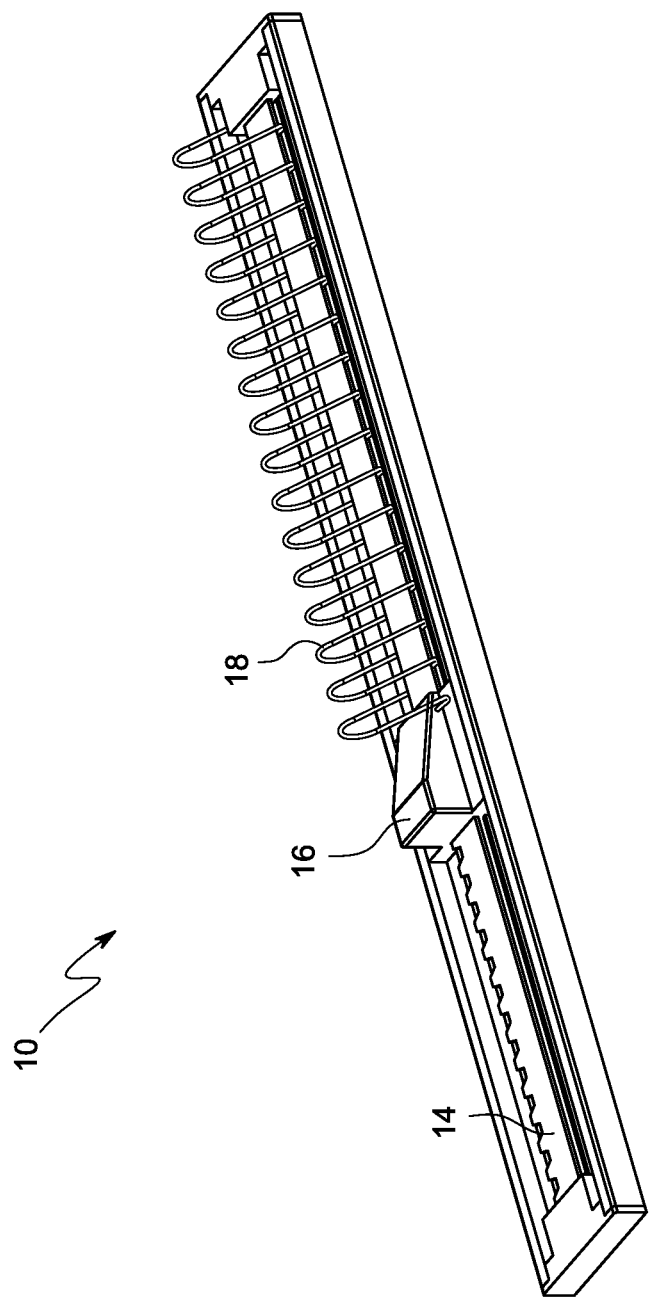
Figure 15:
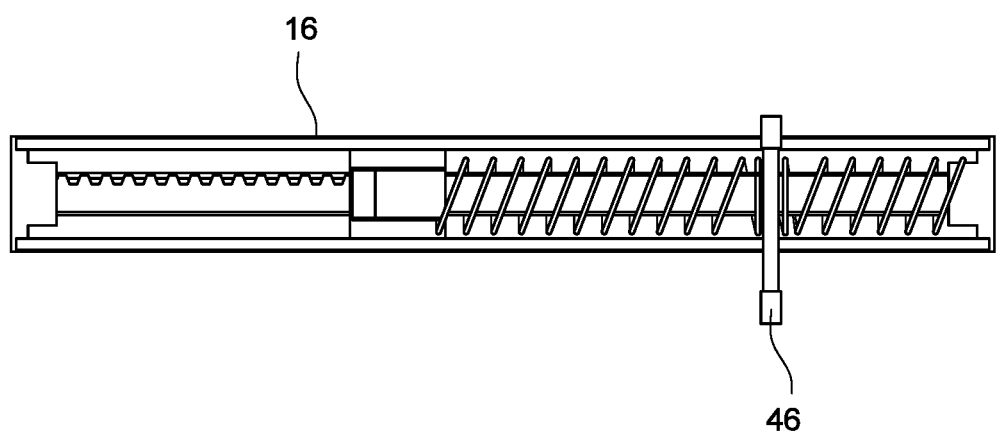
FIG. 15, according to an embodiment of the present invention, is an illustration of the tool holder secured with a tool.

As can be appreciated from FIGS. 1, 2, 10 through 15, the loops 42 of the spring 18 are substantially D-shaped whereby, the loop 42 of the spring 18 comprises an elongate portion 44. The spring 18, while being wound around the central bar 14, is adapted to be secured between the slider 16 and the distal end cap 24 as the elongate portions 44 at either extremities of the spring 18 is received within the aforementioned spring holes 40 that are disposed on the slider 16 and the distal cap 24. As can be appreciated from FIG. 15, a tool 46 is secured to the tool holder 10 as the tool 46 is received between two consecutive loops 42 of the spring 18. Alternatively, the spring 16 may of any shape, such as, circular, rectangular, etc., as long as the functionality thereof is not hampered. As seen in FIGS. 12 through 14, as force of the spring 18 exerted on the slider 16 is not enough to overcome the frictional lock between the slit 36 and the teeth 30, the distance between the loops 42 is adjustable through the actuation of the slider 16 so as to achieve a tighter fit between the loops 42 and the tool 46.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. For example, the protective case assembly can be adapted to accommodate a tablet PC by simply altering the dimensions thereof. However, all such modifications are deemed to be within the scope of the claims.

What is claimed is:
1. An adjustable tool holder comprising:
(a) an elongate, rectangular base member comprising an elongate, longitudinal central groove, the base member comprising opposed proximal and distal ends;
(b) an elongate, central bar having opposing proximal and distal ends attached to the corresponding proximal and distal ends of the base member, and the remaining length of the central bar suspended above and parallel to the central groove of the base member, the central bar laterally divided into a friction toothed portion and a plain portion, the friction toothed portion terminating at the proximal end of the central bar, only a longitudinal edge of the toothed portion comprising friction teeth;
(c) a slider positioned in the groove of the base member to slide along the groove, the slider defining a longitudinal slit therethrough, the toothed portion of the central bar extending through the slit and received snugly therein, the slider frictionally constrained from sliding along the friction toothed portion of the central bar by the friction teeth of the central bar unless manually actuated; and (d) a compression spring having one end secured to the slider and the other end secured to the distal end of the base member, the spring wound around the central bar, wherein manually actuated sliding movement of the slider automatically alters the length of the spring and the distance between consecutive loops of the spring, consecutive loops of the compression spring for holding a tool.

2. The tool holder of claim 1 wherein, the groove is of uniform rectangular cross-section.

3. The tool holder of claim 1 wherein, the base member is of uniform substantially U-shaped cross-section.

4. The tool holder of claim 1 wherein, the slider comprises:
   (a) a rectangular base portion that snugly and slidably fits into the central groove of the base member;
   (b) at least one recessed track defined longitudinally along the base portion of the slider for receiving a corresponding at least one ridge defined on an upper surface of the groove of the base member.

5. The tool holder of claim 1 the base member further comprising: a proximal and a distal end cap, the proximal and distal end caps fitted to the proximal and distal ends of the base member respectively; one end of the spring secured to the distal end cap.

6. The tool holder of claim 1 the spring further comprising a plurality of consecutive loops, the spring loops of a uniform substantially D-shape; the spring held by the base member and the slider at non-curved portions of the spring loops.

7. An adjustable tool holder comprising:
   (a) an elongate base member comprising a longitudinal groove and a pair of opposing ends;
   (b) an elongate bar extending between the opposing ends of the base member and disposed suspended above and parallel to the groove, the bar having a toothed portion at one end thereof, a longitudinal edge of the toothed portion comprising friction teeth;
   (c) a slider positioned slidingly within the groove, the slider defining a longitudinal slit, the toothed portion of the bar snugly received within and extending through the slit, the slider frictionally constrained from movement by the friction teeth absent manual actuation; and
   (d) a compression spring having a plurality of consecutive loops, one end of the spring secured to the slider and the other end secured to the base member, the spring wound around the bar, and wherein manual movement of the slider along the toothed portion of the bar adjusts the length of the spring and distances between consecutive loops of the spring, the consecutive loops for holding tools.

* * * * *